(12) United States Patent
Ho

(10) Patent No.: US 12,478,528 B2
(45) Date of Patent: Nov. 25, 2025

(54) ANTI-SLIP AND QUICK-DETACH FASTENER STRUCTURE

(71) Applicant: Yu-Cheng Ho, Tainan (TW)

(72) Inventor: Yu-Cheng Ho, Tainan (TW)

( * ) Notice: Subject to any disclaimer, the term of this patent is extended or adjusted under 35 U.S.C. 154(b) by 963 days.

(21) Appl. No.: 17/667,025

(22) Filed: Feb. 8, 2022

(65) Prior Publication Data

US 2022/0280365 A1    Sep. 8, 2022

(30) Foreign Application Priority Data

Mar. 2, 2021  (TW) ................................ 110202211

(51) Int. Cl.
*A61G 7/05* (2006.01)
(52) U.S. Cl.
CPC ......... *A61G 7/0504* (2013.01); *A61G 7/0526* (2013.01)
(58) Field of Classification Search
CPC ..... A61G 7/0504; A61G 7/0526; A44B 11/02
See application file for complete search history.

(56) References Cited

U.S. PATENT DOCUMENTS

| 1,718,274 | A | * | 6/1929 | Carlson | A44B 11/02 24/170 |
| 4,117,573 | A | * | 10/1978 | Nakamura | A44B 11/02 24/200 |
| 8,499,420 | B2 | * | 8/2013 | Elia | A44B 11/02 24/200 |

FOREIGN PATENT DOCUMENTS

TW    M567626    10/2018

* cited by examiner

*Primary Examiner* — Sang K Kim
(74) *Attorney, Agent, or Firm* — Muncy, Geissler, Olds & Lowe, P.C.

(57) ABSTRACT

The invention provides an anti-slip and quick-detach fastener structure for using with an annular strap which comprises a fixed end, a first inner edge, a free end, and a second inner edge. The anti-slip and quick-detach fastener structure comprises a fixing ring and a dynamic friction member. The fixing ring comprises a first fixing section, a second fixing section opposite to the first fixing section, and an inserting space. The dynamic friction member comprises a first friction section surrounded by the free end to constrain the second inner edge, and an operating section connected with the first friction section. The first friction section and the second fixing section form a dynamic friction state to jointly clamp the free end, and the first friction section loses the dynamic friction state with the second fixing section and releases the free end when the first friction section is forced to rotate.

5 Claims, 5 Drawing Sheets

ANTI-SLIP AND QUICK-DETACH FASTENER STRUCTURE

FIELD OF THE INVENTION

The invention relates to an anti-slip and quick-detach fastener structure, and more particularly to an anti-slip and quick-detach fastener structure for using with annular strap tools.

BACKGROUND OF THE INVENTION

In hospitals, nursing homes for the elderly and other places, many inpatients are unable to move freely due to factors such as surgical recovery and illness, and often require caregivers to assist them in moving. For example, in the event of emergency situations such as fire and earthquake evacuation, harness tools such as Taiwan utility model patent No. M567626 filed by the inventor of the present invention can be used for rescue. Among the harness tools used by caregivers, in order to adapt to the body shape of the person being cared for, most assisting tools use a fastener or a buckle to connect the harness strap.

However, in the existing harness strap connection devices such as D-ring, ladder ring, etc., the strap must be inserted through the two opposite ends of the adjustment ring first, so that the user can allocate the length of the strap on both sides, when the strap is stressed, the strap will be fastened on the ring more tightly and will not slip off. However, this kind of adjustment ring cannot be quickly detached because the strap needs to pass through the ring holes first, which is complicated in manipulation. In addition, in a buckle such as a pressing buckle made of an elastic material such as plastic, the two ends of the strap are buckled together by the joint structure of the protruding portion and the groove of the buckle. However, this kind of buckle has the risk of detaching when subjected to a large force, and the buckle is pre-formed on the two ends of the strap, which limits the overall length of the strap, and does not have the function of retractably adjusting the length of the strap. Therefore, the prior art obviously cannot meet the existing demands, and there is a need for improvement.

SUMMARY OF THE INVENTION

An object of the invention is to solve the problem that the fastening or buckling method of the strap tools in the prior art cannot have both anti-slip and quick-detach functions.

In order to solve the above problem, the invention provides an anti-slip and quick-detach fastener structure for using with an annular strap, the annular strap comprises a fixed end, a first inner edge located on an inner side of the fixed end, a free end distant from the fixed end, and a second inner edge located on an inner side of the free end. The anti-slip and quick-detach fastener structure comprises a fixing ring and a dynamic friction member. The fixing ring comprises a first fixing section surrounded by the fixed end to constrain the first inner edge, a second fixing section spaced apart from and opposite to the first fixing section, and an inserting space located between the first fixing section and the second fixing section. The dynamic friction member comprises a first friction section surrounded by the free end to constrain the second inner edge, and an operating section connected with the first friction section. Wherein the free end is inserted into the inserting space, the first friction section and the second fixing section form a dynamic friction state to jointly clamp the free end, and the first friction section loses the dynamic friction state with the second fixing section and releases the free end when the first friction section is forced to rotate.

Further, the dynamic friction member comprises a connecting section operably connecting with the first friction section and the fixing ring.

Further, the connecting section is a chain, and the dynamic friction member comprises a hook portion between the connecting section and the first friction section.

Further, contact surfaces between the second inner edge and the first friction section have an appropriate frictional force.

Further, the fixing ring is quadrilateral, and the first fixing section is arranged in parallel and juxtaposed relative to the second fixing section.

Further, the operating section is generally in an arcuate shape that is easy to hold with fingers.

Therefore, the invention has the following beneficial efficacies compared with the prior art:

in the anti-slip and quick-detach fastener structure of the invention, the first friction section is constrained tightly by the second inner edge and abuts against the second fixing section to clamp and fix the free end jointly to achieve an effect of preventing slipping. When the first friction section is forced to rotate, the first friction section is forced distant from the second fixing section, thereby releasing the free end to achieve an effect of quick detaching. In summary, the anti-slip and quick-detach fastener structure of the invention is capable of combining the two functions of anti-slipping and quick detaching.

DETAILED DESCRIPTION OF THE PREFERRED EMBODIMENTS

The technical features and embodiments of the invention described in the following preferred embodying modes in conjunction with the accompanying figures are provided as reference for examining. However, embodiments are only used to illustrate the technical content of the invention, and are not intended to limit the scope of the requested claims of the invention.

Figure 1:
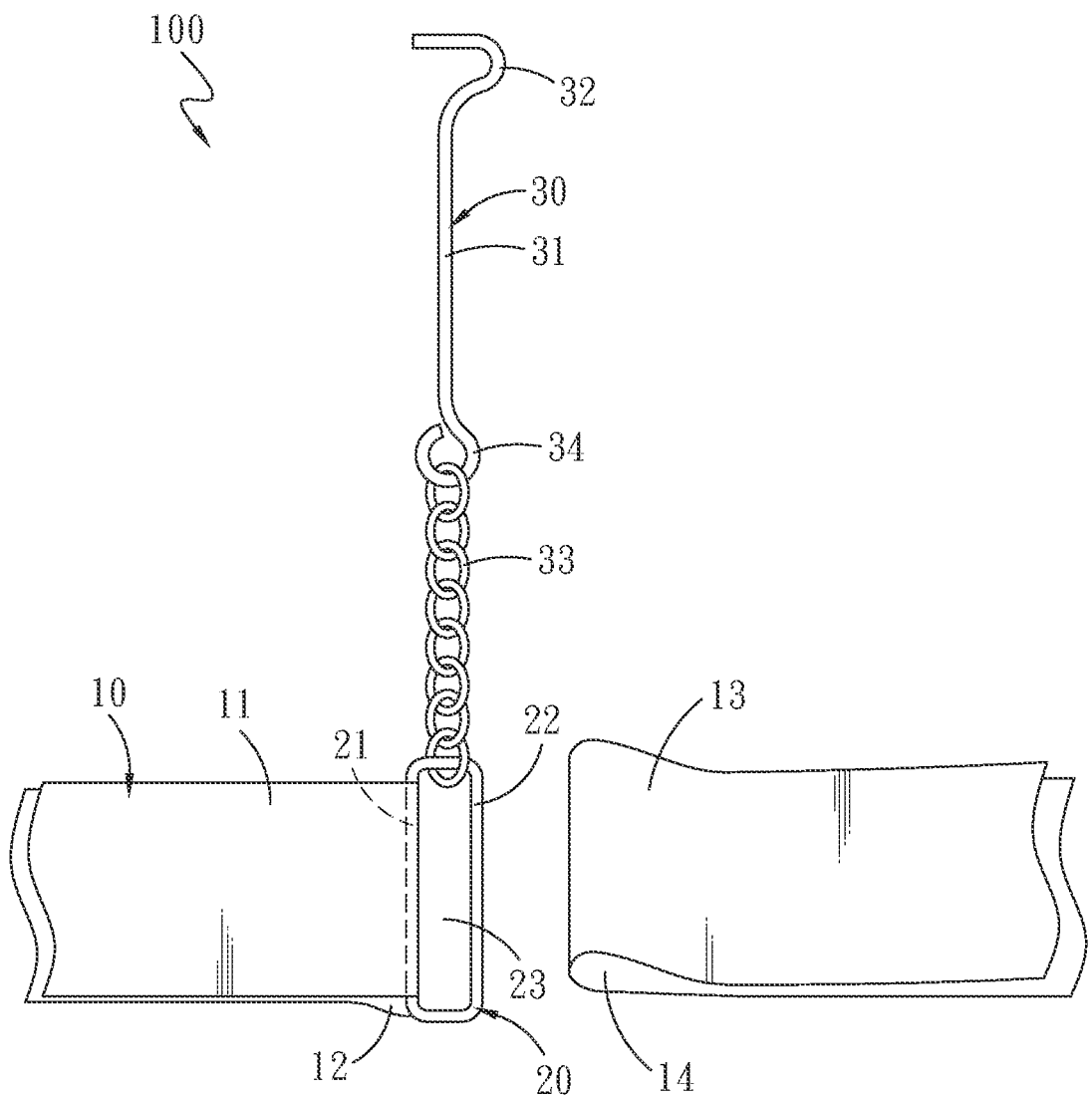
FIG. 1 is a perspective view of a first embodying mode of the invention.

Please refer to FIG. 1, the invention provides an anti-slip and quick-detach fastener structure 100 for using with an annular strap 10. The annular strap 10 can be a tool such as a first aid strap used in medical institutions or a carrying strap used in transportation, but the following description is only used to illustrate a way of using the invention, and is not intended to limit the claims of the invention. In this embodiment, the annular strap 10 comprises a fixed end 11, a first inner edge 12 located on an inner side of the fixed end 11, a free end 13 distant from the fixed end 11, and a second inner edge 14 located on an inner side of the free end 13. Wherein the first inner edge 12 and the second inner edge 14 refer to U-shaped portions at inner edges of two ends of the annular strap 10 after the annular strap 10 is tightened, so the first inner edge 12 and the second inner edge 14 located on the annular strap 10 are not fixed, the first inner edge 12 and the second inner edge 14 located on the annular strap 10 are defined according to a stress condition of the annular strap 10.

Specifically, the anti-slip and quick-detach fastener structure 100 comprises a fixing ring 20 and a dynamic friction member 30. The fixing ring 20 is used for tightening and fixing the annular strap 10, and the dynamic friction member 30 is used for strengthening and releasing a binding relationship between the fixing ring 20 and the annular strap 10. Specifically, the fixing ring 20 comprises a first fixing section 21 surrounded by the fixed end 11 to constrain the first inner edge 12, a second fixing section 22 spaced apart from and opposite to the first fixing section 21, and an inserting space 23 located between the first fixing section 21 and the second fixing section 22. In this embodiment, the fixing ring 20 is quadrilateral, and the first fixing section 21 is arranged in parallel and juxtaposed relative to the second fixing section 22. However, the fixing ring 20 can also be polygonal, circular, oval, etc., which is not limited herein. The dynamic friction member 30 comprises a first friction section 31 surrounded by the free end 13 to constrain the second inner edge 14, and an operating section 32 connected with the first friction section 31. In this embodiment, the dynamic friction member 30 comprises a connecting section 33 operably connecting with the first friction section 31 and the fixing ring 20. The connecting section 33 is a chain, and the dynamic friction member 30 comprises a hook portion 34 between the connecting section 33 and the first friction section 31. The operating section 32 is generally in an arcuate shape that is easy to hold with fingers, so that a user can easily hold and rotate with the fingers.

Figure 2:
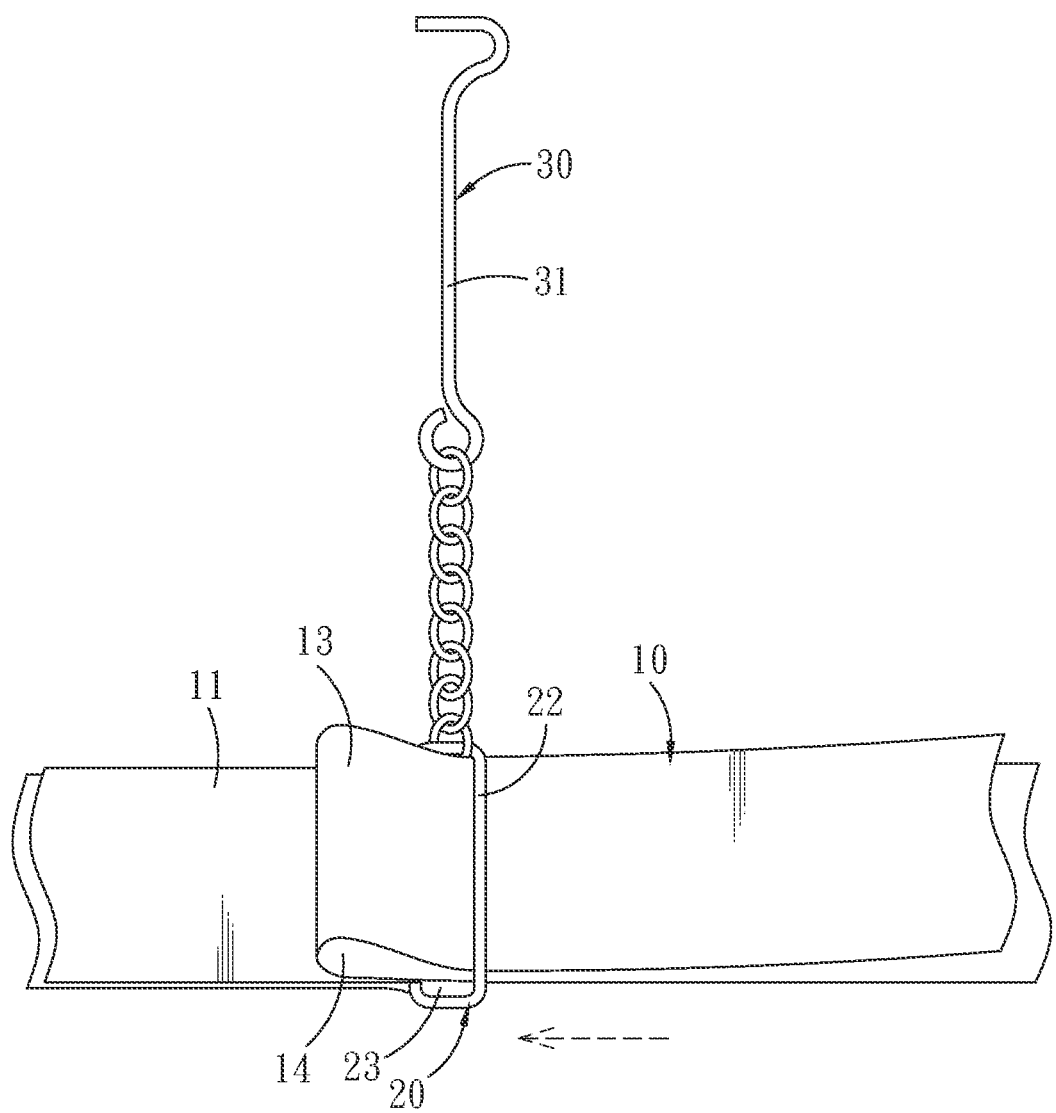
FIG. 2 to FIG. 4 are connection diagrams of the first embodying mode of the invention.
Figure 3:
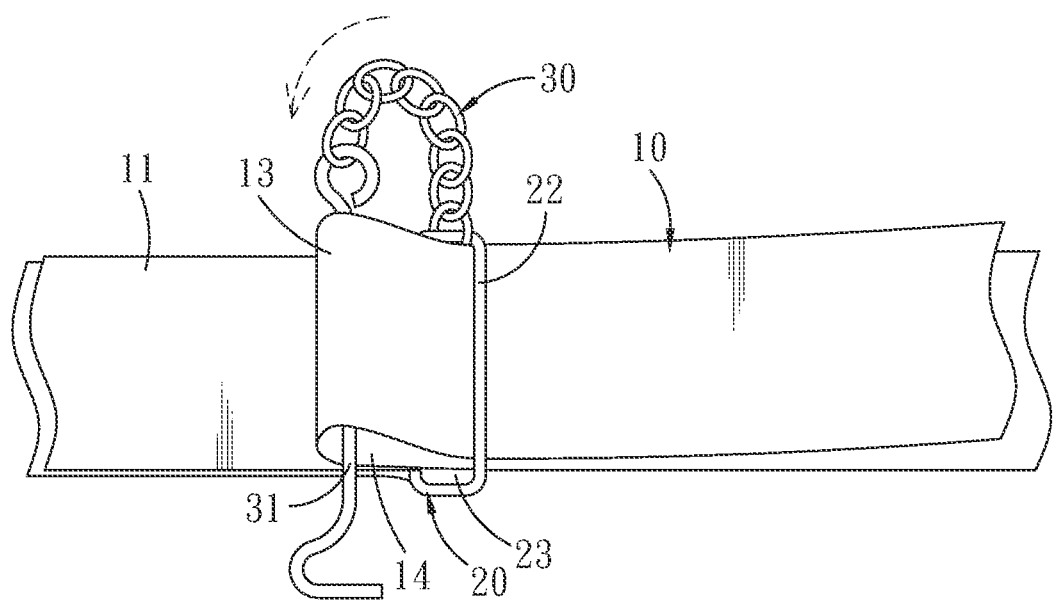
Figure 4:
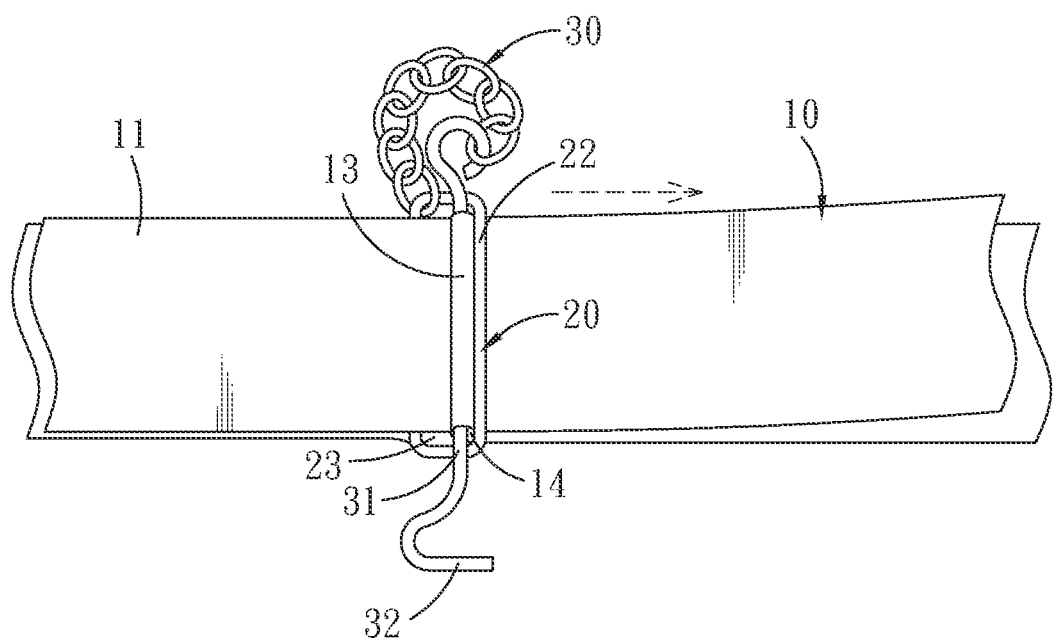
Figure 5:
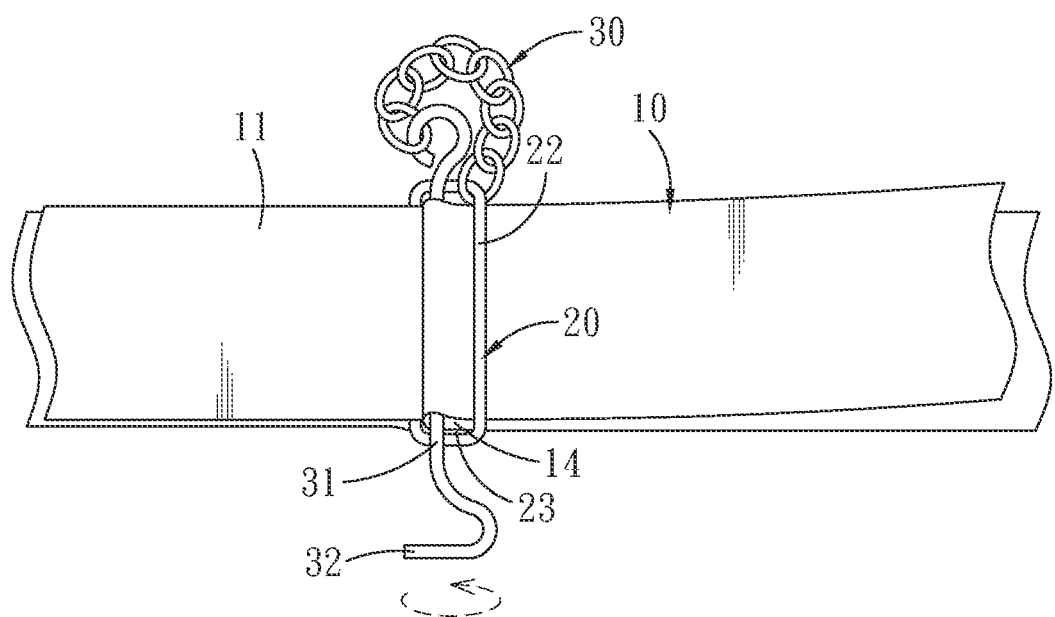
FIG. 5 is a schematic diagram of detaching of the first embodying mode of the invention.

The following describes a way of using the invention, please refer to FIG. 2, FIG. 3 and FIG. 4. Firstly, the user inserts the free end 13 into the inserting space 23, that is, the second inner edge 14 passes through the inserting space 23, and the first friction section 31 and the second fixing section 22 form a dynamic friction state to jointly clamp the free end 13. Wherein an appropriate frictional force is generated on contact surfaces between the second inner edge 14 and the first friction section 31, and a source of the frictional force mainly depends on surface roughness and material of the annular strap 10 and the first friction section 31. For example, if the annular strap 10 is made of nylon fabric, the first friction section 31 can be an electroplated metal rod or the like. With the above structure, the first friction section 31 is constrained tightly by the second inner edge 14 and abuts against the second fixing section 22 to clamp and fix the free end 13 jointly by dynamic friction. At this time, if the annular strap 10 is tightened by a force, a clamping force between the first friction section 31 and the second fixing section 22 will be strengthened to achieve an effect of preventing slipping. Also, please refer to FIG. 5, when the first friction section 31 is forced to rotate, the first friction section 31 is forced to move toward a direction distant from the second fixing section 22, thereby losing a dynamic friction state with the second fixing section 22 and releasing the free end 13, so as to achieve an effect of quick detaching.

What is claimed is:

1. An anti-slip and quick-detach fastener structure for using with an annular strap, wherein the annular strap comprises a fixed end, a first inner edge located on an inner side of the fixed end, a free end distant from the fixed end, and a second inner edge located on an inner side of the free end, the anti-slip and quick-detach fastener structure comprises:
   a fixing ring, comprising a first fixing section surrounded by the fixed end to constrain the first inner edge, a second fixing section spaced apart from and opposite to the first fixing section, and an inserting space located between the first fixing section and the second fixing section; and
   a dynamic friction member, comprising a first friction section surrounded by the free end to constrain the second inner edge, an operating section connected with the first friction section, and a connecting section operably connecting with the first friction section and the fixing ring;
   wherein the free end is inserted into the inserting space, the first friction section and the second fixing section form a dynamic friction state to jointly clamp the free end, and the first friction section loses the dynamic friction state with the second fixing section and releases the free end when the first friction section is forced to rotate.

2. The anti-slip and quick-detach fastener structure as claimed in claim 1, wherein the connecting section is a chain, and the dynamic friction member comprises a hook portion between the connecting section and the first friction section.

3. The anti-slip and quick-detach fastener structure as claimed in claim 1, wherein a frictional force is generated on contact surfaces between the second inner edge and the first friction section.

4. The anti-slip and quick-detach fastener structure as claimed in claim 1, wherein the fixing ring is quadrilateral, and the first fixing section is arranged in parallel and juxtaposed relative to the second fixing section.

5. The anti-slip and quick-detach fastener structure as claimed in claim 1, wherein the operating section is an arcuate shape that is easy to hold with fingers.

* * * * *